(12) United States Patent
Lyle

(10) Patent No.: US 7,539,304 B1
(45) Date of Patent: May 26, 2009

(54) INTEGRATED CIRCUIT HAVING SELF TEST CAPABILITY USING MESSAGE DIGEST AND METHOD FOR TESTING INTEGRATED CIRCUIT HAVING MESSAGE DIGEST GENERATION CIRCUITRY

(75) Inventor: James D. Lyle, Santa Clara, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 803 days.

(21) Appl. No.: 10/298,722

(22) Filed: Nov. 18, 2002

(51) Int. Cl.
*H04K 1/00* (2006.01)

(52) U.S. Cl. .............................. 380/2; 726/34; 713/189; 714/724; 324/765

(58) Field of Classification Search ..................... 380/2; 726/34
See application file for complete search history.

(56) References Cited

U.S. PATENT DOCUMENTS

| | | | | |
|---|---|---|---|---|
| 5,623,545 A | * | 4/1997 | Childs et al. | 380/2 |
| 5,631,960 A | * | 5/1997 | Likens et al. | 380/2 |
| 5,764,761 A | * | 6/1998 | Vicard | 713/189 |
| 5,926,550 A | * | 7/1999 | Davis | 713/176 |
| 6,587,947 B1 | * | 7/2003 | O'Donnell et al. | 713/187 |
| 6,664,803 B2 | * | 12/2003 | Goodman | 326/8 |
| 2002/0191793 A1 | * | 12/2002 | Anand et al. | 380/255 |
| 2003/0041242 A1 | * | 2/2003 | Patel | 713/170 |

* cited by examiner

*Primary Examiner*—Nasser G Moazzami
*Assistant Examiner*—Fikremariam Yalew
(74) *Attorney, Agent, or Firm*—Girard & Equitz LLP

(57) ABSTRACT

An integrated circuit that includes operational circuitry and message digest generation circuitry coupled to the operational circuitry, a method for testing an integrated circuit including message digest generation circuitry, and a system including an integrated circuit (which includes message digest generation circuitry) and at least one external device coupled to the integrated circuit. The message digest generation circuitry is coupled and configured to generate at least one digest of at least one message, where each message is indicative of at least one aspect of the integrated circuit's state. For example, a message can be a sequence of voltages or logic levels sampled at a specific sequence of nodes of operational circuitry of the integrated circuit.

36 Claims, 2 Drawing Sheets

INTEGRATED CIRCUIT HAVING SELF TEST CAPABILITY USING MESSAGE DIGEST AND METHOD FOR TESTING INTEGRATED CIRCUIT HAVING MESSAGE DIGEST GENERATION CIRCUITRY

TECHNICAL FIELD OF THE INVENTION

The invention pertains to use of one or more message digests to test an integrated circuit ("chip"), and to generation of message digests by circuitry of a chip for use in testing the chip.

BACKGROUND OF THE INVENTION

There are a number of conventional algorithms for generating message digests in response to messages. Examples include the SHA-1, MD4, and MD5 algorithms. Such algorithms have been implemented in hardware as well as in software. The common characteristic of these algorithms is that they can take a very large message and condense it into a much smaller "message digest" (sometimes referred to as a "digest"). The digest is very sensitive to even the smallest change in the original message. Therefore any change to or substitution of the message is likely (with a very high probability) to be discovered by comparing digests of the original message and the changed or substituted message. Another characteristic of a message digest is that the digest leaks very little information about the original message.

Message digests have well known uses in the cryptography world, especially in digital signature algorithms and the like. The inventor has recognized that the very characteristics that make the message digests good for these conventional purposes would also make them suitable for testing the internals of an integrated circuit. During testing of a chip in accordance with some embodiments of the invention, the "message" to be digested is the internal state of the chip (or some aspect of such internal state). The internal state can be quite complex and can vary over time in complicated ways. Moreover, very little of it may be observable outside the chip under ordinary circumstances.

Conventional solutions to the problem of how to test a chip typically make use of "scan chains," which seek to capture much of the internal state and make it visible outside the chip. In typical test using a scan chain, register values are serially shifted into the chip, the chip is operated for some period of time, and a resulting set of register values is serially extracted from the chip. However, scan chains are not an ideal solution for a number of reasons, including the following:

scan chains add complexity to the chip and slow down timing paths. This increases cost and reduces performance;

scan chains cannot be used during normal operation. They are only available in special test modes;

scan chains typically can only capture the state of the chip at one particular moment in time. Capturing multiple states can be done only slowly (one at a time), and at risk of altering the internal state;

scan chains make a chip's internal state visible. While this helps to test the device, it significantly reduces the security of the information the chip contains (such as cryptographic keys);

scan chains can be used to alter the internal state of a device. White this is desirable in some cases, it can be a significant problem in others (such as security applications). A scan operation can alter the device's internal state in a number of ways. For example, a memory array that is not part of the scan chain could be corrupted or erased as unusual states cycle through its control registers; and scan chains are not suitable for all kinds of logic, such as large memory arrays.

Before the present invention, the testability of integrated circuit implementations of cryptographic devices that use unique key sets had been limited due to the need to keep confidential some (or some aspects) of the devices' internal states to avoid releasing cryptographically sensitive information. However, in accordance with the invention, such devices can be tested using message digests without releasing cryptographically sensitive information.

Message digests have been generated by chips for purposes other than testing the chips. For example, repeater chips that implement the cryptographic protocol known as the "High-bandwidth Digital Content Protection" ("HDCP") protocol have generated digests (indicative of key selection vector lists) during authentication exchanges. However, these digests have been generated and used for security purposes; not for testing the internal state of a chip in which a digest has been generated.

SUMMARY OF THE INVENTION

In a class of embodiments, the invention is an integrated circuit that includes operational circuitry having a variable state, and message digest generation circuitry coupled to the operational circuitry. The digest generation circuitry is configured to generate at least one digest of at least one message from the operational circuitry, where each message is indicative of at least one aspect of the operational circuitry's state. For example, a message can be a sequence of voltages or logic levels sampled (in a specific sequence) at specific nodes of the operational circuitry.

In some embodiments, the inventive chip has one or more output pads at which the digest generation circuitry can assert each digest (so that an external device coupled to each pad can receive each digest), and the chip can be tested using each digest (e.g., by analyzing, processing, comparing to at least one expected result, or otherwise operating on each digest) asserted at each output pad. In other embodiments, the inventive chip writes some or all of the digests that it generates to memory that is (e.g., registers that are) accessible by an external device (e.g., via an I²C or I²C-like bus, or a Microwire, SPI, RS-232, or other serial bus, or a parallel bus, or any proprietary scheme). For example, this can allow an external device to compare a digest asserted by the chip at an output pad (or written into a register in the chip) at a first time with another digest asserted by the chip (or written into a register in the chip) at a later time to determine whether the internal state of the operational circuitry has changed between the two times.

In other embodiments, the inventive chip is configured to generate at least one test result by operating on at least one digest generated by digest generation circuitry thereof (e.g., by comparing each such digest to a known value or otherwise using each such digest). The chip can have one or more output pads at which each test result can be asserted to an external device. Alternatively, the chip can have memory that is (e.g., registers that are) accessible by an external device (e.g., via an I²C or I²C-like bus, or a Microwire, SPI, RS-232, or other serial bus, or a parallel bus, or any proprietary scheme) and into which each test result to be made available to the external device is written.

Among the advantages of using one or more message digests to test a chip in accordance with the invention (rather than performing a conventional scan chain test on the chip) are the following:

the message digest generation circuitry of a chip that embodies the invention can be implemented as an input only function that does not affect the operation of other elements (e.g., operational circuitry) of the chip. Registers (in operational circuitry of the chip) can have their inputs fixedly connected to appropriate nodes of the circuitry at all times, including at times when the message digest generation circuitry is obtaining a message from the operational circuitry (or generating a digest of such a message) and at times when the message digest generation circuitry is idle. No multiplexers are needed to map the inputs of such registers to different nodes during "test mode" operation than during "normal" operation. Thus the inventive chip (or at least the operational circuitry thereof) can be implemented with fewer gates and logic levels than would be required to implement a conventional version of such a chip that lacks message digest generation circuitry and can be tested only using a scan chain;

the message digest generation circuitry of a chip that embodies the invention can generate a digest of the chip's internal state during normal operation of the chip. It is not necessary for the chip to enter a special test mode before a digest of its internal state can be generated. For example, a cryptographic device implemented as a chip could perform a memory test in accordance with the invention, by generating a digest based on a set of cryptographic keys (e.g., those used in the conventional HDCP content protection protocol) and comparing the digest to a predetermined value, every time the keys are read during normal operation of the chip. The predetermined value can be stored with the keys, so that it is available to help ensure that the keys are read properly. For another example, a cryptographic device implemented as chip could perform a self test in accordance with the invention, by generating a digest of a sequence of state bits and comparing the digest to a predetermined value, each time the chip performs an authentication operation;

the sequence of inputs (e.g., sampled data values) asserted to the message digest circuitry of a chip that embodies the invention is critical. The message digest circuitry can be implemented to process a sequence of two or more device states (each indicated by a different message asserted to the message digest circuitry, or all indicated by different elements of one message asserted to the message digest circuitry) and to do so quickly;

the message digest generation circuitry (of a chip that embodies the invention) hides the chip's internal state even if it asserts digests to an external device. The chip can be tested using only the digests asserted by the message digest generation circuitry to an external device (e.g., by comparing the digests to a predetermined value or by comparing later-generated digests to previously-generated digests). In typical implementations, each digest is cryptographically secure;

the message digest generation circuitry (of a chip that embodies the invention) can readily be implemented so that it cannot alter the state of the circuitry that supplies its inputs, and therefore can be used with freedom; and a message digest (generated by a chip that embodies the invention) can be indicative of elements of the chip that cannot be easily scanned. For example, even a large memory array of the chip can be tested in accordance with the invention using a message digest generated by the chip. There are a number of ways to do this. In some embodiments, the entire memory array contents are fed into the message digest generation circuitry, either simultaneously or (more likely) sequentially. In some other embodiments, only operations of the memory array (e.g., reads and writes in a given time interval) are digested.

Well-designed message digest generation circuitry can entirely eliminate the need for a scan chain to test at least some parts of a chip. However, it is contemplated that both testing approaches will be employed in concert to test some embodiments of the inventive chip.

A typical test of a chip that embodies the invention would work as follows. Starting from a known state (or a known set of inputs), the chip would be allowed to operate during a test interval. This could be one cycle, or one operation, or multiple operations, or some other measure. During the test interval, the message digest generation circuitry would digest data indicative of select parts of the chip's internal state. After the test interval, at least one generated digest (typically a large number, but much smaller than the volume of data that has been digested to generate the digest) would be compared to a known value. The known value could be a previously calculated result, or it could be a previously measured or captured result (e.g., a previously generated digest). Comparison of each digest with a known value can be performed by circuitry onboard the chip (e.g., in the message digest generation circuitry) to perform a built-in self test ("BIST"), and data indicative of a result of the BIST can be asserted to an external device. Alternatively, comparison of each digest with a known value could be performed by an external device.

Other aspects of the invention are methods for operating and/or testing any embodiment of the inventive integrated circuit, and methods for testing an integrated circuit that includes message digest generation circuitry. Another aspect of the invention is a system including an integrated circuit (which includes message digest generation circuitry) and at least one external device coupled to the integrated circuit, where the external device is configured to test the integrated circuit by operating on one or more message digests generated by the message digest generation circuitry.

DETAILED DESCRIPTION OF THE PREFERRED EMBODIMENTS

The term "transmitter" is used herein in a broad sense to denote any unit capable of transmitting data over a communication link (and optionally also encoding and/or encrypting the data to be transmitted). The term "receiver" is used herein in a broad sense to denote any unit capable of receiving data that has been transmitted over a communication link (and optionally also decoding and/or decrypting the received data). For example, the term transmitter can denote a transceiver that performs the functions of a receiver as well as the functions of a transmitter.

The expression "cryptographic device" is used herein to denote a device that includes a cipher engine, where the cipher engine is configured to use at least one key to encrypt content or to decrypt encrypted content.

Figure 1:
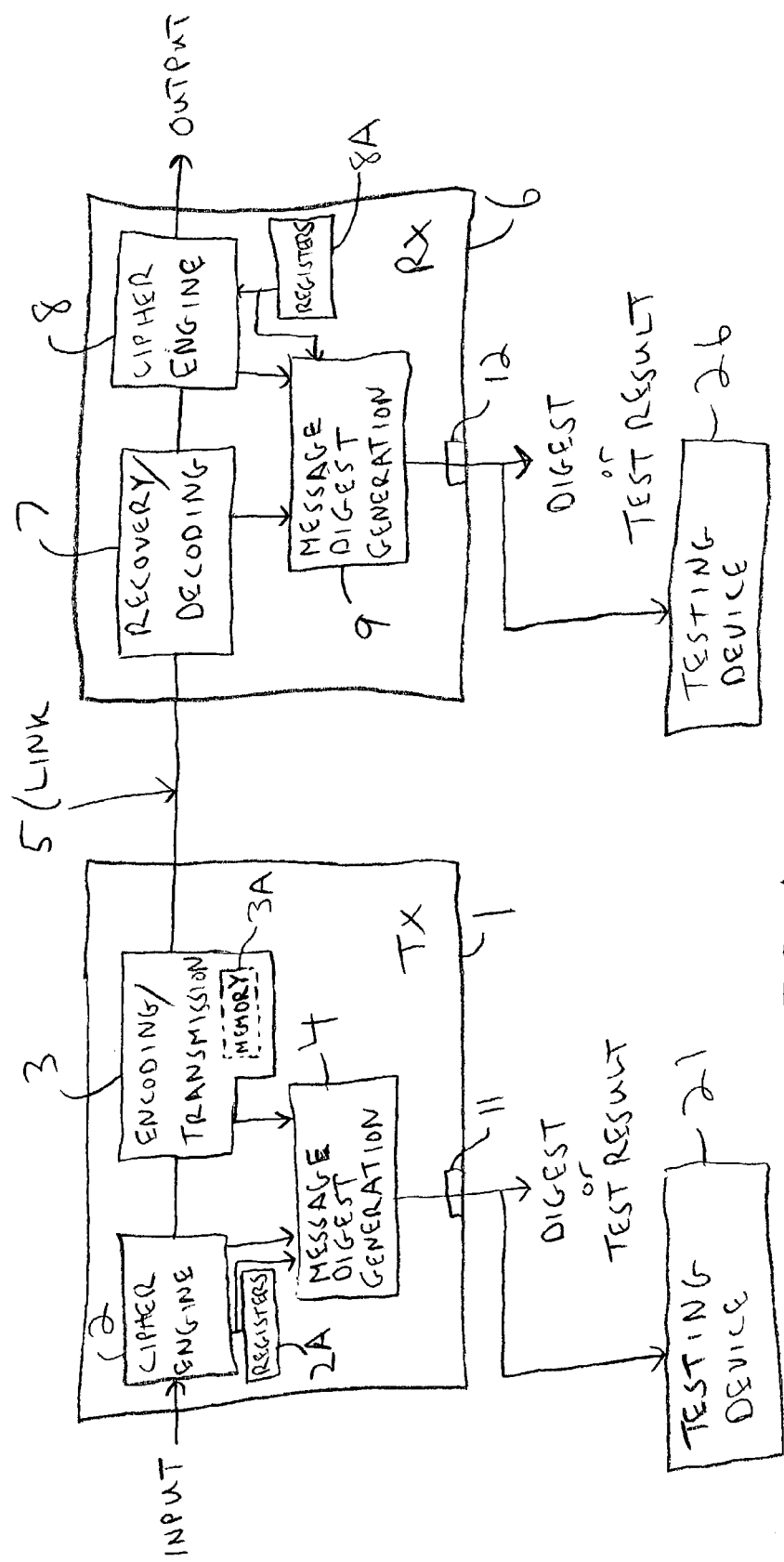
FIG. 1 is a block diagram of a system including a transmitter, a receiver, and a link between them. Each of the transmitter and the receiver is implemented as integrated circuit that embodies the present invention.

In a class of embodiments, the invention is a transmitter or receiver implemented as an integrated circuit. For example, each of transmitter 1 and receiver 6 of FIG. 1 is an integrated circuit that embodies the invention. Each of transmitter 1 and receiver 6 is a cryptographic device. Other embodiments of the invention are integrated circuits that are not cryptographic devices. Some embodiments of the invention are neither transmitters nor receivers.

With reference to FIG. 1, transmitter 1 transmits encoded, encrypted data (e.g., video data) over link 5 to receiver 3, and receiver 6 decodes and decrypts the data it receives.

Transmitter 1 includes cipher engine 2, registers 2A, encoding and transmission circuitry 3, and message digest generation circuitry 4, connected as shown. Cipher engine 2, registers 2A, and encoding and transmission circuitry 3 together comprise operational circuitry. Receiver 3 includes data recovery and decoding circuitry 7, cipher engine 8, registers 8A, and message digest generation circuitry 9, connected as shown. Cipher engine 8, registers 8A, and recovery and decoding circuitry 7 together comprise operational circuitry.

Cipher engine 2 encrypts input data and asserts the encrypted data to circuitry 3. Circuitry 3 encodes the encrypted data and optionally also (when link 5 is a serial link) serializes the encoded bits, and transmits the resulting data over link 5. Circuitry 7 of receiver 6 de-serializes the data received over link 5 (in the case that link 5 is a serial link), decodes the de-serialized code words, and asserts words of the decoded data to cipher engine 8. Cipher engine 8 decrypts the decoded data and outputs the resulting decrypted data.

Registers 2A are loaded with values that are employed during normal operation of cipher engine 2. In some implementations, registers 2A are loaded at appropriate times with values, received via an interface (not shown) in chip 1, from an external memory (e.g., an EEPROM) coupled to chip 1. Similarly, registers 8A are loaded with values that are employed during normal operation of cipher engine 8. In some implementations, registers 8A are loaded at appropriate times with values, received via an interface (not shown) in chip 6, from an external memory (e.g., an EEPROM) coupled to chip 6.

Message digest generation circuitry 4 is coupled to receive messages from each of cipher engine 2, registers 2A, and circuitry 3. Each "message" from cipher engine 2 and/or circuitry 3 consists of data indicative of the state of cipher engine 2 and/or circuitry 3 (and/or data indicative of the contents of registers 2A). For example, a message can be a sequence of voltages or logic levels sampled by circuitry 4 (with specific timing) at a specific sequence of nodes of circuitry 3. Circuitry 4 is configured to generate a digest of each received message, such that each digest is indicative of at least one aspect of the state of cipher engine 2 and/or circuitry 3. Circuitry 4 preferably serializes each digest, and asserts each digest (by asserting a serial stream of data indicative of the digest) to pad 11 so that an external device (e.g., testing device 21) coupled to pad 11 can receive and operate on each digest, e.g., to determine a test result from one or more of the digests. For example, external testing device 21 could be configured to compare a digest asserted to pad 11 at a first time with another digest asserted to pad 11 at a later time to determine whether the internal state of operational circuitry of transmitter chip 1 has changed between the two times. Alternatively, the inventive chip has multiple output pads, an external device can be coupled via a parallel link to the pads, and the chip can assert bits indicative of each digest in parallel to the pads so that the external device can receive and operate on each digest.

Alternatively, circuitry 4 is configured to perform a built-in self test ("BIST") including by processing (or otherwise operating on) one or more of the digests that it generates (e.g., by comparing each digest to a known value) to generate at least one BIST result, and asserting each BIST result to pad 11. The known value could be a previously calculated result, or it could be a previously measured or captured result (e.g., a previously generated digest) or some other known value. Each BIST result could be a single bit. If each BIST result comprises multiple bits, circuitry 4 could serialize each BIST result, and assert each BIST result (by asserting a serial stream of data indicative of the BIST result) to pad 11 so that an external device (e.g., testing device 21) coupled to pad 11 can receive each BIST result. Alternatively, the inventive chip has multiple output pads, an external device can be coupled via a parallel link to the pads, and the chip can assert bits indicative of each BIST result in parallel to the pads so that the external device can receive each BIST result. Alternatively, each BIST result could be displayed or otherwise indicated (e.g., a BIST result having a first value could illuminate a warning light coupled to chip 1) and/or could be used internally by the chip that generates it (e.g., chip 1 could enter a predetermined state in response to generation by circuitry 4 of a BIST result having a specific value).

Similarly, message digest generation circuitry 9 is coupled to receive messages from each of cipher engine 8, registers 8A, and circuitry 7. Each such "message" consists of data indicative of the state of cipher engine 2 and/or circuitry 3 (and/or data indicative of the contents of registers 8A). For example, a message can be a sequence of voltages or logic levels sampled by circuitry 9 (with specific timing) at a specific sequence of nodes of circuitry 7. Circuitry 9 is configured to generate a digest of each received message, such that each digest is indicative of at least one aspect of the state of cipher engine 8 and/or circuitry 7. Circuitry 9 preferably serializes each digest, and asserts each digest (by asserting a serial stream of data indicative of the digest) to pad 12 so that an external device (e.g., testing device 26) coupled to pad 12 can receive and process (or otherwise operate on) each digest (e.g., to determine a test result from one or more of the digests). For example, external testing device 26 could be configured to compare a digest asserted to pad 12 at a first time with another digest asserted to pad 12 at a later time to determine whether the internal state of operational circuitry of receiver chip 6 has changed between the two times.

Alternatively, circuitry 9 is configured to perform a built-in self test ("BIST") including by processing (or otherwise operating on) one or more of the digests that it generates (e.g., by comparing each digest to a known value) to generate at least one BIST result, and asserting each BIST result to pad 12. The known value could be a previously calculated result, or it could be a previously measured or captured result (e.g., a previously generated digest). Each BIST result could be a single bit. If each BIST result comprises multiple bits, circuitry 9 could serialize each BIST result, and assert each BIST result (by asserting a serial stream of data indicative of the BIST result) to pad 12 so that an external device (e.g., testing device 26) coupled to pad 12 can receive each BIST result. Alternatively, each BIST result could be displayed or otherwise indicated (e.g., a BIST result having a first value could illuminate a warning light coupled to chip 6) and/or could be used internally by the chip that generates it (e.g., chip 6 could enter a predetermined state in response to generation by circuitry 9 of a BIST result having a specific value).

Message digest generation circuitry 4 is preferably implemented so that it does not affect the operation of the operational circuitry (2 and 3) of chip 1, and message digest generation circuitry 9 is preferably implemented so that it does not affect the operation of the operational circuitry (7 and 8) of chip 6. Registers in cipher engine 2 and circuitry 3 (or cipher engine 8 and circuitry 7) can have their inputs fixedly connected to appropriate nodes at all times, including when message digest generation circuitry 4 (or 9) is obtaining a message from cipher engine 2 and/or circuitry 3 (or cipher engine 8 and/or circuitry 7), and when message digest generation circuitry 4 (or 9) is idle. No multiplexers are needed to map the inputs of such registers to different nodes during "normal" operation and "test mode" operation.

Message digest generation circuitry 4 is preferably configured to generate a digest of the internal state (or some aspect of the internal state) of chip 1 during normal operation of the chip, so that it is not necessary for chip 1 to enter a special test mode before the digest can be generated.

Typically, message digest generation circuitry 4 and message digest circuitry 9 are configured so that the sequence of inputs (e.g., sampled data values) to each of them is critical. Some implementations of message digest circuitry 4 (or 9) can quickly process a sequence of two or more device states, in the sense that the message digest circuitry can rapidly generate a message digest (or a sequence of message digests) in response to a sequence of different messages rapidly asserted thereto, or in response to a sequence of different elements (e.g., data values) of a single message rapidly asserted thereto.

Typically, message digest generation circuitry 4 is configured so that the only aspects of its state (and of the messages asserted thereto) that are accessible to devices external to chip 1 are the message digests asserted by circuitry 4 at pad 11, and these message digests do not reveal the internal state of operational circuitry 2 and/or 3. Similarly, message digest generation circuitry 9 is configured so that the only aspects of its state (and of the messages asserted thereto) that are accessible to devices external to chip 2 are the message digests asserted by circuitry 9 at pad 12, and these message digests do not reveal the internal state of operational circuitry 7 and/or 8. Thus, chip 1 can be tested by revealing only a message digest (or two or more message digests) to an external device (e.g., testing device 21). Circuitry 4 and 9 can readily be implemented so that each digest that it generates (and asserts to pad 11 or 12) is cryptographically secure.

Message digest circuitry 4 and 9 can be implemented so as to be incapable of altering the state of the circuitry that supplies its inputs (i.e., circuitry 4 can be implemented so as to be incapable of altering the state of operational circuitry 2 or 3, and circuitry 9 can be implemented so as to be incapable of altering the state of operational circuitry 7 or 8). Therefore, the message digest circuitry can be used with freedom.

It should be appreciated that a chip that embodies the invention need not be a transmitter or receiver. The invention can be embodied in a wide variety of integrated circuits that are neither transmitters nor receivers.

A message digest generated by chip 1 or 6 (or other chip that embodies the invention) can be indicative of elements of the chip that cannot be easily scanned. For example, even a large memory array (e.g., memory array 3A in circuitry 3, or a memory array in circuitry 7) can be tested in accordance with the invention using a message digest. There are a number of ways to do this. In some embodiments, the entire contents of a memory array (e.g., registers 2A or 8A, or at least one other register) are fed into message digest generation circuitry (e.g., circuitry 4 or 9), either simultaneously or (more likely) sequentially. In some other embodiments, operations (but not contents) of a memory array (e.g., reads and writes in a given time interval) are digested.

Preferably, message digest generation circuitry 4 and 9 are configured to generate a digest of at least one aspect of the internal state of the chip in which each is implemented (chip 1 or 6) during normal operation of the chip. Preferably, the message digest generation circuitry also uses the digest to test the chip while the chip operates normally. It is not necessary for the chip to enter a special test mode before a digest of its internal state (or an aspect of the internal state) is generated and used to test the chip. For example, if cipher engine 2 is configured to implement the HDCP content protection protocol, circuitry 4 can be configured perform a memory test by generating a digest based on a set of cryptographic keys (asserted to circuitry 4, from registers 2A for example), comparing the digest to a predetermined value, and optionally also asserting a result of the comparison to pad 11, every time the keys are read by cipher engine 2 during normal operation of chip 1. The predetermined value can be stored with the keys in registers 2A, so that it is available to help ensure that the keys are read properly. For another example, if cipher engine 2 is configured to implement the HDCP protocol, circuitry 4 can be configured to perform a self test of cipher engine 2 by generating a digest of a sequence of state bits (asserted to circuitry 4 from cipher engine 2), comparing the digest to a predetermined value, and optionally also asserting a result of the comparison to pad 11, each time cipher engine 2 performs an authentication operation (e.g., with chip 6) during normal operation of chip 1. In the latter example, the sequence of state bits can be indicative of a sequence of state transitions of cipher engine 2 during the authentication operation.

The message digest generation circuitry of the inventive chip can be configured to operate only in a special test mode of the chip (e.g., a test mode performed during manufacture of the chip). More typically, however, the message digest generation circuitry of the inventive chip operates to test the chip during a normal operating mode; not only during a special test mode of the chip. For example, the message digest generation circuitry can function as a supervisor that watches and tests the chip at all times (or periodically, or in response to predetermined events) during normal operation.

Typically, neither chip 1 nor 6 includes circuitry for implementing a scan chain test of any subsystem or element of such chip, since adequate testing of the chip can be performed using message digests generated in accordance with the invention. However, if chip 1 (or 6) does include scan chain test circuitry, the scan chain test circuitry can be used in concert with message generation circuitry 4 (or 9) to test the chip.

Figure 2:
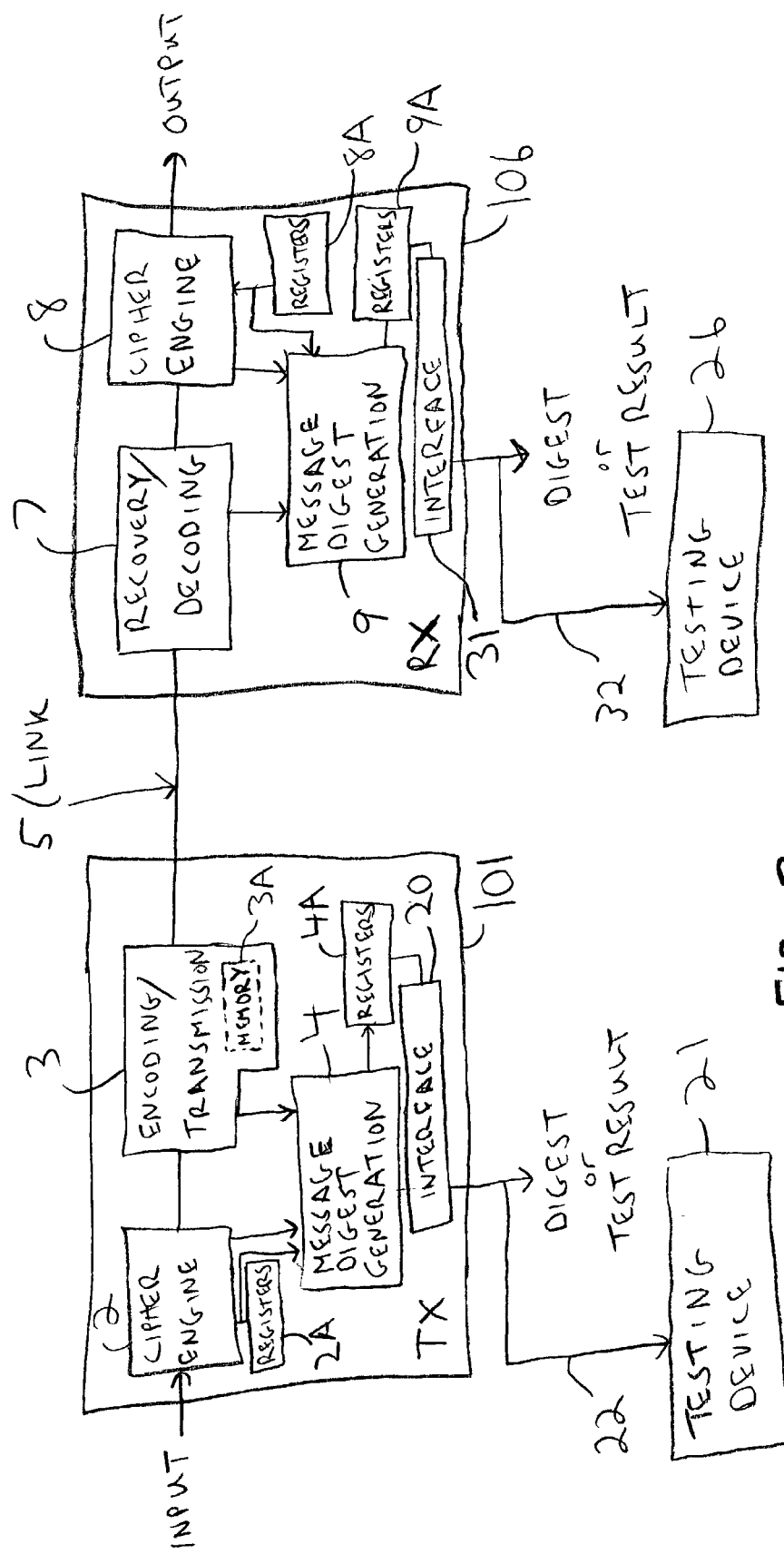
FIG. 2 is a block diagram of a system including a transmitter, a receiver, and a link between them. Each of the transmitter and the receiver is implemented as integrated circuit that embodies the present invention.

Another class of embodiments of the inventive chip (and a system that includes two such chips) will be described with reference to FIG. 2. In the FIG. 2 system, each of transmitter 101 and receiver 106 is an integrated circuit that embodies the invention. Chip 101 of FIG. 2 is a variation on chip 1 of FIG. 1, and differs from chip 1 only in that it includes registers 4A and interface 20 in place of a pad (pad 11) coupled directly to message digest generation circuitry 4. All elements of chip 101 that are identical to corresponding elements of chip 1 are numbered identically in FIGS. 1 and 2, and the above description of them (with reference to FIG. 1) will not be repeated with reference to FIG. 2. In variations on chip 101 of FIG. 2, registers 4A are replaced by some other memory.

Chip 106 of FIG. 2 is a variation on chip 6 of FIG. 1, and differs from chip 6 only in that it includes registers 9A and interface 31 in place of a pad (pad 12) coupled directly to message digest generation circuitry 9. All elements of chip 106 that are identical to corresponding elements of chip 6 are numbered identically in FIGS. 1 and 2, and the above description of them (with reference to FIG. 1) will not be repeated with reference to FIG. 2. In variations on chip 106 of FIG. 2, registers 9A are replaced by some other memory.

Interface 20 of chip 101 is coupled between registers 4A and link 22. External testing device 21 is also coupled to link 22. Link 22 can be an I²C or I²C-like bus, or a Microwire, SPI, RS-232, or other serial bus, or a parallel bus. In one preferred implementation, message digest generation circuitry 4 of chip 101 is configured to write some or all of the digests that it generates to registers 4A. Interface 20 is configured to respond to an access request received over link 22 (from device 21) by providing device 21 with access to each digest in registers 4A for which access has been requested. Thus, device 21 can access each digest in registers 4A via link 22 and interface 20. In some implementations, device 21 communicates with interface 20 via link 22 in accordance with a proprietary scheme. In some implementations, device 21 can read a first digest that has been written into registers 4A at a first time, and read a second digest that has been written into registers 4A at a later time, and compare the first digest with the second digest to determine whether the internal state of chip 101's operational circuitry has changed between the two times.

In another preferred implementation, message digest generation circuitry 4 of chip 101 is configured to generate at least one test result by operating on at least one digest that it generates, and to write each such test result to registers 4A. Device 21 can access each test result in registers 4A via link 22 and interface 20.

Similarly, in one preferred implementation of chip 106, interface 31 is coupled between registers 9A and link 32. External testing device 26 is also coupled to link 32. Link 32 can be an I²C or I²C-like bus, or a Microwire, SPI, RS-232, or other serial bus, or a parallel bus. In one preferred implementation, message digest generation circuitry 9 of chip 106 is configured to write some or all of the digests that it generates to registers 9A. Interface 31 is configured to respond to an access request received over link 32 (from device 26) by providing device 26 with access to each digest in registers 9A for which access has been requested. Thus, device 26 can access each digest in registers 9A via link 32 and interface 31. In some implementations, device 26 communicates with interface 31 via link 32 in accordance with a proprietary scheme.

In another preferred implementation, message digest generation circuitry 9 of chip 106 is configured to generate at least one test result by operating on at least one digest that it generates, and to write each such test result to registers 9A. Device 26 can access each test result in registers 9A via link 32 and interface 31.

A typical test of chip 1 (or other chip that embodies the invention) would work as follows. Starting from a known state (or a known set of inputs), the chip would be allowed to operate during a test interval. This could be one cycle, or one operation, or multiple operations, or some other measure. During the test interval, message digest generation circuitry of the chip (e.g., message digest generation circuitry 4 of chip 1) would digest data values indicative of select parts of the internal state of operational circuitry of the chip (e.g., circuitry 2 and/or registers 2A and/or circuitry 3 of chip 1). At the end of the interval, at least one generated message digest (typically a large number, but much smaller than the volume of data that has been digested to generate the digest) would be compared to a known value. The known value could be a previously calculated result, or it could be a previously measured or captured result (e.g., a previously generated digest). Comparison of each digest with a known value could be performed by the message digest generation circuitry itself, to allow the chip to perform a built-in self test ("BIST"). In this case, the chip could output (at a pad) data indicative of a result of the BIST, or could write such BIST result data to a register or other memory readable (e.g., via an interface) by an external device. Alternatively, a device external to the chip (e.g., testing device 21 of FIG. 1 or 2) could perform a comparison of each digest generated by the chip with a known value (if each digest is asserted to the device by the chip, or stored in a register or registers of the chip and then accessed from the register(s) by the device).

Message digest generation circuitry of the inventive chip (e.g., digest generation circuitry 4 of chip 1 or digest generation circuitry 9 of chip 6) can be implemented as small, simple circuitry, and thus can easily and practically be included in a chip that embodies the invention even if the chip does not need the message digest generation circuitry for any purpose other than for performing a BIST. Some conventional chips (e.g., some conventional cryptographic devices implemented as integrated circuits) have message digest generation functions that are used for purposes other than testing. Such a chip can be modified in accordance with the invention to re-use the same logic that is conventionally used for message digest generation (for non-testing purposes), to perform testing of the chip accordance with the invention.

Another aspect of the invention is a system (e.g., chip 1 and testing device 21 of FIG. 1, chip 6 and testing device 26 of FIG. 1, or chip 101 and device 21 of FIG. 2) that includes an integrated circuit (e.g., chip 1, 6, or 101) which includes message digest generation circuitry, and at least one external device (e.g., testing device 21 or 26) coupled to the integrated circuit. The external device is configured to test the integrated circuit using one or more message digests generated by the message digest generation circuitry.

Other aspects of the invention are methods for operating and/or testing any embodiment of the inventive integrated circuit, and methods for testing an integrated circuit that includes message digest generation circuitry. For example, in a class of embodiments, the invention is a method for testing operational circuitry of an integrated circuit, where the integrated circuit also includes message digest generation circuitry, including the steps of: (a) asserting at least one message to the message digest generation circuitry, and operating the message digest generation circuitry to generate at least one message digest of the at least one message; and (b) performing at least one test of the operational circuitry using at least one said message digest. In some embodiments, step (b) includes the steps of: (c) operating the message digest generation circuitry to compare at least one said message digest with at least one known value, and (d) generating a test result as a result of at least one comparison performed in step (c). In other embodiments, step (b) includes the steps of: (c) providing at least one said message digest to an external device; and (d) operating the external device to perform the at least one test using each message digest provided to said external device.

In another class of embodiments, the invention is a method for testing an integrated circuit, wherein the integrated circuit includes message digest generation circuitry and has a variable state during operation, including the steps of: (a) allowing the integrated circuit to operate during a test interval, wherein the integrated circuit is in a known initial state at the start of the test interval; (b) during the test interval, asserting at least one message to the message digest generation circuitry, wherein each said message is indicative of at least one aspect of the integrated circuit's state, and operating the message digest generation circuitry to generate at least one digest of the at least one message; and (c) comparing at least one digest generated during step (b) to a known value.

It should be understood that while certain forms of the present invention are illustrated and described herein, the invention is defined by the claims and is not to be limited to the specific embodiments described and shown.

What is claimed is:

1. An integrated circuit, comprising:
    message digest generation circuitry;
    operational circuitry coupled and configured to assert at least one message to the message digest generation circuitry, wherein the operational circuitry has a variable state during operation, each said message is indicative of at least one aspect of the operational circuitry's state, and the message digest generation circuitry is configured to generate at least one digest of at least one said message, wherein each said digest is indicative of at least one aspect of the operational circuitry's state; and
    at least one output pad coupled to the message digest generation circuitry, wherein the message digest generation circuitry is configured to generate at least one test result including by operating on the digest and to assert at least one said test result to the output pad.

2. The integrated circuit of claim 1, wherein the operational circuitry is configured to assert a sequence of messages to the message digest generation circuitry.

3. The integrated circuit of claim 2, wherein the message digest generation circuitry is configured to generate a sequence of digests of the messages and to generate a sequence of test results by comparing one of the digests to a known value.

4. The integrated circuit of claim 2, wherein the message digest generation circuitry is configured to generate a sequence of digests of the messages and to generate a sequence of test results by comparing one of the digests to a previously generated one of the digests.

5. The integrated circuit of claim 1, wherein the message digest generation circuitry is configured to generate a test result by comparing the digest to a known value.

6. The integrated circuit of claim 1, also including:
    a memory coupled to the message digest generation circuitry; and
    an interface coupled to the memory, wherein the message digest generation circuitry is configured to write at least one said test result to the memory, and the interface is configured to allow an external device to access each test result that has been written to the memory in response to an access request from the external device when said external device is coupled to the interface.

7. The integrated circuit of claim 6, wherein the memory is a set of registers.

8. The integrated circuit of claim 1, wherein the message digest generation circuitry is configured to perform a built-in self test, including by operating on the at least one digest, and to generate the at least one test result while performing the self test.

9. The integrated circuit of claim 1, wherein the operational circuitry has a normal operating mode, the operational circuitry is configured to assert each said message to the message digest generation circuitry while operating in the normal operating mode, and the message digest generation circuitry is configured to generate each said digest while the operational circuitry operates in the normal operating mode.

10. The integrated circuit of claim 9, wherein the message digest generation circuitry is configured to perform at least one built-in self test, including by operating on each said digest while the operational circuitry operates in the normal operating mode.

11. The integrated circuit of claim 1, wherein the integrated circuit is a cryptographic device.

12. The integrated circuit of claim 11, also including:
    memory that stores cryptographic keys, wherein the operational circuitry is configured to assert at least one message indicative of the keys to the message digest generation circuitry each time said keys are read from the memory, and the message digest generation circuitry is configured to generate a digest of each said message indicative of the keys.

13. The integrated circuit of claim 12, wherein the message digest generation circuitry is configured to perform a built-in self test, including by operating on each said digest of each said message indicative of the keys.

14. The integrated circuit of claim 11, wherein the operational circuitry is configured to perform an authentication operation, and to assert at least one message indicative of a sequence of state bits to the message digest generation circuitry each time said operational circuitry performs the authentication operation.

15. The integrated circuit of claim 14, wherein the message digest generation circuitry is configured to generate a digest of each said message indicative of the sequence of state bits, and to perform a built-in self test, including by operating on each said digest of each said message indicative of the sequence of state bits.

16. The integrated circuit of claim 1, also including:
    memory that stores data, wherein the operational circuitry is configured to assert at least one message indicative of the data to the message digest generation circuitry each time said data are read from the memory, and the message digest generation circuitry is configured to generate a digest of each said message indicative of the data.

17. The integrated circuit of claim 16, wherein the message digest generation circuitry is configured to perform a built-in self test, including by operating on each said digest of each said message indicative of the data.

18. The integrated circuit of claim 1, also including:
    a memory that stores data, wherein the operational circuitry is configured to assert at least one message indicative of the data to the message digest generation circuitry, and the message digest generation circuitry is configured to generate a digest of each said message indicative of the data.

19. The integrated circuit of claim 1, also including:
    a memory, wherein the operational circuitry is configured to assert to the message digest generation circuitry at least one message indicative of at least one operation of the memory, and the message digest generation circuitry is configured to generate a digest of each said message indicative of said at least one operation.

20. A method for testing an integrated circuit, wherein the integrated circuit includes message digest generation circuitry and operational circuitry having a variable state during operation, said method including the steps of: a) asserting at least one message digest generation circuitry, wherein each said message is indicative of at least one aspect of the operational circuitry's state, and operating the message digest generation circuitry to generate at least one aspect of the operational circuitry's state; and b) performing at least one test of the integrated circuit, including by operating on at least one said digest in circuitry within the integrated circuit to generate at least one test result wherein step (b) includes the steps of: c) operating the message digest generation circuitry to compare at least one said digest with at least one known value; and d) generating a test result as a result of at least one comparison performed in step (c).

21. The method of claim 20, wherein step (a) includes the steps of asserting a sequence of messages to the message digest generation circuitry, and operating the message digest generation circuitry to generate a sequence of digests of the messages, and wherein step (b) includes the step of generating a sequence of test results, including by operating on the digests.

22. The method of claim 21, wherein step (b) includes the step of generating each of the test results by comparing one of the digests to a known value.

23. The method of claim 21, wherein step (b) includes the step of generating each of the test results by comparing one of the digests to a previously generated one of the digests.

24. The method of claim 20, wherein step (b) includes the step of operating the message digest generation circuitry to perform a built-in self test of the integrated circuit, including by operating on at least one said digest.

25. The method of claim 20, wherein the integrated circuit has a normal operating mode, and steps (a) and (b) are performed while the integrated circuit operates in the normal operating mode.

26. The method of claim 20, wherein the integrated circuit includes a memory that stores data, and step (a) includes the steps of asserting at least one message indicative of the data to the message digest generation circuitry each time said data are read from the memory, and operating the message digest generation circuitry to generate at least one digest of each said message indicative of the data.

27. The method of claim 20, wherein the integrated circuit is a cryptographic device, and step (a) includes the step of asserting at least one message indicative of a sequence of state bits to the message digest generation circuitry each time the cryptographic device performs an authentication operation.

28. The method of claim 20, wherein the integrated circuit includes a memory, and step (a) includes the steps of asserting at least one message indicative of at least one operation of the memory to the message digest generation circuitry, and generating a digest of each said message indicative of said at least one operation.

29. A method for testing an integrated circuit, wherein the integrated circuit includes message digest generation circuitry and operational circuitry having a variable state during operation, said method including the steps of: a) asserting at least one message digest generation circuitry, wherein each said message is indicative of at least one aspect of the operational circuitry's state, and operating the message digest generation circuitry to generate at least one aspect of the operational circuitry's state; and b) performing at least one test of the integrated circuit, including by operating on at least one said digest in circuitry within the integrated circuit to generate at least one test result wherein step (b) includes the steps of: c) operating the message digest generation circuitry to compare at least one said digest with at least one known value; and d) generating a test result as a result of at least one comparison performed in step (c).

30. The method of claim 29, wherein the operational circuitry has a normal operating mode, and steps (a) and (b) are performed while the operational circuitry operates in the normal operating mode.

31. The method of claim 29, wherein the operational circuitry includes a memory that stores data, and step (a) includes the steps of asserting at least one message indicative of the data to the message digest generation circuitry, and operating the message digest generation circuitry to generate at least one digest of each said message indicative of the data.

32. The method of claim 29, wherein the integrated circuit is a cryptographic device, and step (a) includes the step of asserting at least one message indicative of a sequence of state bits to the message digest generation circuitry each time the operational circuitry performs an authentication operation.

33. The method of claim 29, wherein the operational circuitry includes a memory, and step (a) includes the steps of asserting to the message digest generation circuitry at least one message indicative of at least one operation of the memory, and generating a digest of each said message indicative of said at least one operation.

34. A method for testing an integrated circuit, wherein the integrated circuit includes message digest generation circuitry and operational circuitry having a variable state during operation, said method including the steps of:
(a) allowing the integrated circuit to operate during a test interval, wherein the integrated circuit is in a known initial state at the start of the test interval;
(b) during the test interval, asserting at least one message to the message digest generation circuitry, wherein each said message is indicative of at least one aspect of the integrated circuit's state, and operating the message digest generation circuitry to generate at least one digest of the at least one message, wherein each said digest is indicative of at least one aspect of the operational circuitry's state; and
(c) comparing at least one digest generated during step (b) to a known value, in circuitry within the integrated circuit, to generate at least one test result.

35. The method of claim 34, wherein step (b) includes the steps of:
during the test interval, asserting a sequence of messages to the message digest generation circuitry, and operating the message digest generation circuitry to generate a sequence of digests of the messages, and wherein step (c) includes the step of comparing one of the digests to a previously generated one of the digests.

36. The method of claim 34, wherein step (b) includes the steps of:
during the test interval, asserting a sequence of messages to the message digest generation circuitry, and operating the message digest generation circuitry to generate a digest of the messages.

* * * * *

UNITED STATES PATENT AND TRADEMARK OFFICE
CERTIFICATE OF CORRECTION

PATENT NO. : 7,539,304 B1
APPLICATION NO. : 10/298722
DATED : May 26, 2009
INVENTOR(S) : James D. Lyle It is certified that error appears in the above-identified patent and that said Letters Patent is hereby corrected as shown below:

In column 12, line 66, "result" is replaced by --result,--;
In column 13, line 49, "message" is replaced by --message to the message--;
In column 13, lines 52-53, "aspect of the operational circuitry's state" is replaced by --digest of the at least one message--; and
In column 13, line 56, "result" is replaced by --result,--.

Signed and Sealed this

Eleventh Day of August, 2009

David J. Kappos
*Director of the United States Patent and Trademark Office*